United States Patent [19]

Albert et al.

[11] Patent Number: 5,296,204

[45] Date of Patent: Mar. 22, 1994

[54] THALLIUM EXTRACTION PROCESS

[75] Inventors: Luc Albert, Elancourt; Hervé Masson, Mareil-Marly, both of France

[73] Assignee: Metaleurop S.A., France

[21] Appl. No.: 921,415

[22] Filed: Jul. 27, 1992

Related U.S. Application Data

[63] Continuation of Ser. No. 650,576, Feb. 4, 1991, abandoned.

[30] Foreign Application Priority Data

Feb. 5, 1990 [FR] France .................................. 90 01301

[51] Int. Cl.$^5$ .............................................. C01G 15/00
[52] U.S. Cl. .................................... 423/112; 210/670; 210/688
[58] Field of Search .................. 204/182.4, 140, 141.5; 423/111, 112, 117, 139, 87, 89, 100; 210/681, 688, 670

[56] References Cited

U.S. PATENT DOCUMENTS

| | | | |
|---|---|---|---|
| 2,897,050 | 7/1959 | Jaffe | 210/688 |
| 3,755,161 | 8/1973 | Yokota et al. | 210/679 |
| 3,847,841 | 11/1974 | Motani et al. | 423/87 |
| 4,241,039 | 12/1980 | Koh et al. | 423/87 |
| 4,297,183 | 10/1991 | Georgeaux | 204/117 |
| 4,525,332 | 6/1985 | Boateng et al. | 210/681 |

FOREIGN PATENT DOCUMENTS 1188422  7/1989  Japan.

OTHER PUBLICATIONS

CA 94(4):91164n, Sudersanan et al., Jan. 1981.

*Primary Examiner*—David Brunsman
*Attorney, Agent, or Firm*—Blakely, Sokoloff, Taylor & Zafman

[57] ABSTRACT

The invention relates to a process for extracting thallium present especially in aqueous wastes of industrial origin.

The process, which makes it possible to extract and recover thallium from a solution which contains it in the form of a salt of a strong inorganic acid, comprises a stage of bringing the said solution into contact with an ion exchange resin containing a thiol group.

This process exhibits good selectivity in relation to salts of metals or metalloids which are usually present in industrial aqueous wastes.

8 Claims, No Drawings

THALLIUM EXTRACTION PROCESS

This is a continuation of application Ser. No. 07/650,576 filed on Feb. 4, 1991 now abandoned.

The present invention relates to the extraction of thallium present in aqueous waste, especially of industrial origin, and the recovery of the thallium which is extracted.

It relates more particularly to the fixation on ion exchange resins of the thallous ion present in solutions which can be very dilute.

It is known that thallium is a rare metal which is present especially as a minor impurity in pyrites and blendes. It is important to remove this metal element because of its high toxicity. It is also advantageous to recover it, because its salts are employed for various uses, for example in medicine as a "per os" epilatory, for the manufacture of imitation diamonds, as a catalyst, and as Clérisil's solution for the measurement of specific weights of ore mixtures.

Furthermore, the toxicity of this element leads to the adoption of standards in the field of occupational hygiene (since 1960, a content of less than 0.20 mg/Nm$^3$) and of strict standards in the respect of discharges.

Present extraction techniques are both costly and not very satisfactory, insofar as they result in the storage of hydroxide cakes with a relatively low content of thallium. In fact, the rarity of this element results in only very low concentrations in the effluents, from which it is difficult to produce precipitates which are concentrated while having a complete degree of removal.

This is why one of the objectives of the present invention is to provide a process which makes it possible to extract thallium from solutions in which it is dissolved at a low concentration, in order to reduce the thallium concentration of the said solutions to acceptable values and, in any event, ones which are at least lower than the usual detection threshold, that is to say lower than 0.1 mg/l.

Another objective of the present invention is to provide a process which is selective in respect of other metals or metalloids with which thallium is associated, such as the elements present in blendes and in pyrites.

Another objective is to provide a process of the above type which employs ion exchange resins which are easy to regenerate.

Another objective of the present invention is to provide a process which makes it possible to obtain thallium in metallic form, or in the form of a marketable salt of good purity, or in the form of a concentrate which can be easily stored.

These objectives, and others which will appear in what follows, are achieved by a process for extracting and recovering thallium from a solution in which it is present in the form of salts of strong inorganic acids such as halohydric sulfuric acids, which comprises a stage of bringing the said solution into contact with an ion exchange resin containing a thiol group.

A thiol group means any group containing the atom sequence —C—S—H and preferably the thioalcohol or thiophenol groups; however, among these active groups, resins which comprise both a thiol group and a vicinal sulfonic group, such as, for example, that marketed by the Duolite company under the name of IMAC GT 73, give best results. This is why this resin, which has the following main characteristics, is preferably employed:

- a crosslinked polystyrene network containing slightly acidic active sites of the type specified above
- a total capacity of 1,400 milliequivalents per liter
- a relative density of 0.8 in the H$^+$ form.

These two latter characteristics are of no major importance to the process.

A resin of this type has been essentially developed for removing zinc, silver, copper, lead, cadmium and, to a lesser extent, nickel, cobalt and iron (in the form of Fe(II)).

The research which has led to the process according to the present invention has shown that, unforeseeably, it was possible in various inorganic acid and acid salt media to fix thallium selectively in respect of metals such as zinc, cadmium, nickel, cobalt, lead, bismuth, iron, alkali metals, alkaline-earth metals and a metalloid like antimony or arsenic. Selectivity in respect of these various metals or metalloids is obviously variable. Selectivity in respect of copper and arsenic remains less satisfactory, but it is nevertheless satisfactory for ensuring good separation according to the alternative forms described below.

It is preferable that the redox potential of the solution should be kept at a reducing level, firstly in order to spare the thiol groups which are reductive, and secondly so that the thallium may be already at the lowest oxidized valency, or that it may attain it during its contact with the resin.

A satisfactory reducing agent is sulfurous acid and its salts. This is particularly marked in the case of thallium, because of the stability of the sulfite complexes of the thallous ion.

The redox potential is preferably maintained in the redox potential/ph diagram below a line varying from 0.6 V at pH $-1$ up to $+0.2$ V at PH 6, and then $-0.1$ V at pH 13 and above a value higher than $-0.4$ V.

Studies which have led to the present invention have shown that the least oxidized form of thallium was fixed on the resin when the PH was higher than 1.

To make use of the thallium extraction process according to the invention it is therefore desirable that the pH of the initial solution to be treated should be adjusted to a value above 1.

To recover selectively the thallium present in a solution containing other species capable of being fixed on the resin, it is possible to envisage two alternative forms of the process according to the invention.

According to a first alternative form, the pH is adjusted to a value at which virtually all the thallium is fixed on the resin, whereas a very small part, or even an undetectable part, of the other elements present is fixed. For example, arsenic is particularly well fixed at acidic pH values and the fixation is excellent even at negative pH values. If it is desired to fix thallium selectively from a solution containing both thallium and arsenic, the pH is maintained at a value above 4, preferably at a value between 6 and 13.

The elution of thallium is then carried out by means of an acidic solution at a pH which is lower than approximately 1, preferably lower than or equal to zero.

According to a second alternative form, the pH is adjusted to a value at which virtually all the thallium is fixed on the resin, but also a quantity which is not insignificant of one or more of the other elements. Elutions are then carried out, firstly in conditions which are specific for thallium, to recover the thallium, and secondly in conditions which are specific for the other elements, if it is desired to recover the latter or to regenerate the resin completely.

When arsenic has been fixed, the elution is carried out by means of a basic solution at a pH higher than approximately 8, advantageously higher than 9, and preferably between 9.5 and 15. It is thus possible to employ aqueous ammonia at concentrations of between 1 N and 10 N and sodium hydroxide between 0.5N and 3N.

These properties, which are unexpected and newly revealed by the studies which have led to the present invention, of the resins containing a thiol group, make it possible to implement various methods of using the invention, depending on whether or not it is desired to separate thallium completely from the other elements present in the solution, and depending on the place and time which are chosen for the said separation.

Thus, according to an alternative form of the invention, it is possible to use a process which comprises the following stages:
a) fixing thallium and arsenic at a pH of between 1 and 3, the arsenic and the thallium being present in a solution of zinc and/or cadmium sulfate,
b) eluting thallium by means of sulfuric acid at a normality of between 0.5 and 5, preferably 0.5 to 2,
c) eluting arsenic by means of an alkaline solution chosen from the group of alkali metal and ammonium (aqueous ammonia, amine, tetraalkylammonium) hydroxides and carbonates at a pH higher than 8.

According to another alternative form of the invention, it is possible to use a process for extracting arsenic, thallium and, where appropriate, cadmium, from an inorganic solution containing them, which comprises the following sequence of stages:
a) bringing the solution into contact with the resin containing a thiol group at a pH lower than 1
b) partially neutralizing to bring the solution to a pH of between 2 and 5 and bringing it into contact with another bed of resin of the same type as the preceding one
c) optionally cementing cadmium to zinc powder or precipitating a cadmium carbonate
d) regenerating the resin which is charged with arsenic in stage a) by means of an alkaline solution chosen from the group of alkali metal and ammonium hydroxides and carbonates
e) regenerating the resin charged with thallium in stage b) by means of eluting with sulfuric acid at a normality of between 0.5 and 5.

Since the thiol group is easily oxidizable, it is preferable to regenerate the groups which were oxidized using sodium sulfide.

The examples which follow, and which are not limiting in any way in their nature, are intended to enable specialists to determine easily the operating conditions which it is appropriate to employ in each particular case.

EXAMPLE 1

Combined fixation of arsenic and of thallium
in the presence of zinc and cadmium
A solution which has the following composition:

| | |
|---|---|
| Cd | 6.3 g/l |
| As | 0.82 g/l |
| Zn | 2.1 g/l |
| Tl | 0.34 g/l |
| Fe | 0.022 g/l |

-continued

Combined fixation of arsenic and of thallium
in the presence of zinc and cadmium
A solution which has the following composition:

| | | |
|---|---|---|
| Anions | mixture of bisulfite (in equilibrium with sulfurous acid), sulfate, bisulfate and chloride ions | 5 g/l | is brought into contact with an IMAC GT 73 resin under the following conditions:
100 ml of the above solution per 20 ml of resin, room temperature
initial pH: 2.07
final pH: 1.98.

Analysis of the solution obtained gives the following results:
Tl: 0.057 g/l, that is 1.41 g/l on the resin
Cd: 5 g/l, that is 6.5 g/l on the resin
As: not detected, that is approximately 4 g/l on the resin.

This solution is brought back into contact with the resin under the following conditions:
100 ml of the above solution per 20 ml of resin, room temperature
initial pH: 1.98
final pH: 1.87.

After the second contact, analysis of the solution gives the following results:
Tl: 0.006 g/l, that is 0.26 g/l on the resin
Cd: 3.4 g/l, that is 8 g/l on the resin.

The apparent partition coefficient varies greatly between the two contacts, since, in the case of thallium, it is 25 during the first contact and 43 for the second, whereas in the case of cadmium it is 1.3 for the first and 2.3 for the second.

The coefficient of selectivity between cadmium and thallium, on the other hand, does not vary, since it is 19 in the first case and 18.4 in the second.

Zinc is not fixed.

Each test was carried out with virgin resin.

EXAMPLE 2

Separation of thallium
Fixation of thallium
A solution which has the following composition:

| | | |
|---|---|---|
| Tl | | 240 mg/l |
| As | | 270 mg/l |
| Anions | mixture of bisulfite (in equilibrium with sulfurous acid), sulfate and bisulfate ions | | percolation rate: 6 BV/hour
total percolated volume: 50 BV
initial pH: 8

After percolation the solution contains less than 1 mg/liter of thallium and the resin has fixed 13 g/l of thallium.

Elution of the resin

The elution is performed with an aqueous solution of sulfuric acid containing 20 g/l of $H_2SO_4$.

After elution the solution contains 5.5 g/l of Tl, corresponding to an elution efficiency of 91%.

Cementation of thallium on zinc plate

The efficiency is higher than 99% after 1 hour at pH 3.

EXAMPLE 3

Fixation of thallium on resins. Comparative test

The tests were carried out on the following 2 resins:
resin sold under the name IMAC TMR (—S—H thiol group), marketed by the Duolite company;
resin sold under the name Lewatit TP 214, marketed by the Bayer Company

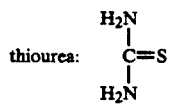

thiourea:

The treated solution is a solution composed of:

| The treated solution is a solution composed of: | |
|---|---|
| Tl: 0.64 g/l | $SO_4^-$ = 25.9 g/l |
| Cd: 1 mg/l | $Cl^-$ = 6.6 g/l |
| As: 1 mg/l | pH = 9.6 | the electroneutrality is ensured by the sodium ion

After one hour's contact at room temperature between 10 ml of resin and 5 liters of aqueous phase, we observe:

| | | | |
|---|---|---|---|
| IMAC GT 73 | charge on resin | 151 g/l | |
| | Tl in aqueous phase | 0.338 g/l | |
| TP 214 | charge on resin | 10 g/l | |
| | Tl in aqueous phase | 620 mg/l | |

EXAMPLE 4

A solution whose composition is the following:

| Zn: | 140 g/l | (in the form of $ZnSO_4$) |
|---|---|---|
| Cd: | 5 g/l | (in the form of $CdSO_4$) |
| Tl: | 0.26 g/l | (in the form of $Tl_2SO_4$) | percolates through a column of IMAC GT 73 resin at the rate of 5 BV/h and at room temperature. Two tests were conducted at different pH values. After saturation of the resin column, we measured the cadmium, thallium and zinc charge on the resin.

| Results | Fixed Tl | Fixed Cd | Selectivity |
|---|---|---|---|
| test 1 pH = 1.5 | 2.57 g/l | 5.94 g/l | 8.3 |
| test 2 pH = 3 | 6.89 g/l | 27.7 g/l | 4.8 |

The selectivity is defined as the ratio of two factors $\alpha/\beta$, it being known that:

$$\alpha = \frac{[Tl] \text{ organic } \Phi}{[Tl] \text{ aqueous } \Phi}$$

$$\beta = \frac{[Cd] \text{ organic } \Phi}{[Cd] \text{ aqueous } \Phi}$$

The zinc charge on the resin is virtually nil after the impregnating substance has been stripped off.

We claim:

1. A process for extracting and recovering thallium from a solution which contains said thallium in the form of salts of strong inorganic acids and salts selected from the group consisting of zinc, cadmium, nickel, cobalt, lead, bismuth and arsenic salts, wherein wherein said solution has a redox potential which is maintained at a reducing level, which process comprises a step of bringing the said solution into contact with an ion exchange resin containing a thiol group.

2. The process as claimed in claim 1, wherein the pH is maintained at a value higher than 1.

3. The process as claimed in claim 2, wherein, in order to fix thallium selectively relative to arsenic, the pH is fixed at a value of between 4 and 13.

4. The process as claimed in claim 1, wherein the resin is regenerated by eluting the thallium by means of an acidic solution at a pH lower than approximately 1.

5. The process as claimed in claim 1, wherein the resin is regenerated by eluting the arsenic by means of a basic solution at a pH higher than 8.

6. The process as claimed in claim 1, which comprises the following stages:
   a) fixing thallium and arsenic at a pH of between 1 and 3, the arsenic and the thallium being present in a solution of zinc and/or cadmium sulfate
   b) eluting thallium by means of sulfuric acid at a normality of between 0.5 and 5
   c) eluting arsenic by means of an alkaline solution chosen from the group of alkali metal and ammonium (aqueous ammonia, amine, tetraalkylammonium) hydroxides and carbonates at a higher pH higher than 8.

7. The process as claimed in claim 1, wherein arsenic and thallium are separated by the following sequence of stages:
   a) bringing the solution into contact with the resin containing a thiol group at a pH lower than 1
   b) partially neutralizing the solution of stage a) to bring the solution to a pH of between 2 and 5;
   c) contacting the neutralized solution with another bed of resin of the same type as in stage a)
   d) regenerating the resin which is charged with arsenic in stage a) by means of an alkaline solution chosen from the group of alkali metal and ammonium hydroxides and carbonates
   e) regenerating the resin charged with thallium in stage b) by means of eluting with sulfuric acid at a normality of between 0.5 and 5.

8. The process as claimed in claim 1, wherein the ion exchange resin containing the thiol group also contains vicinal sulfonic groups.

* * * * *